Figure 1:
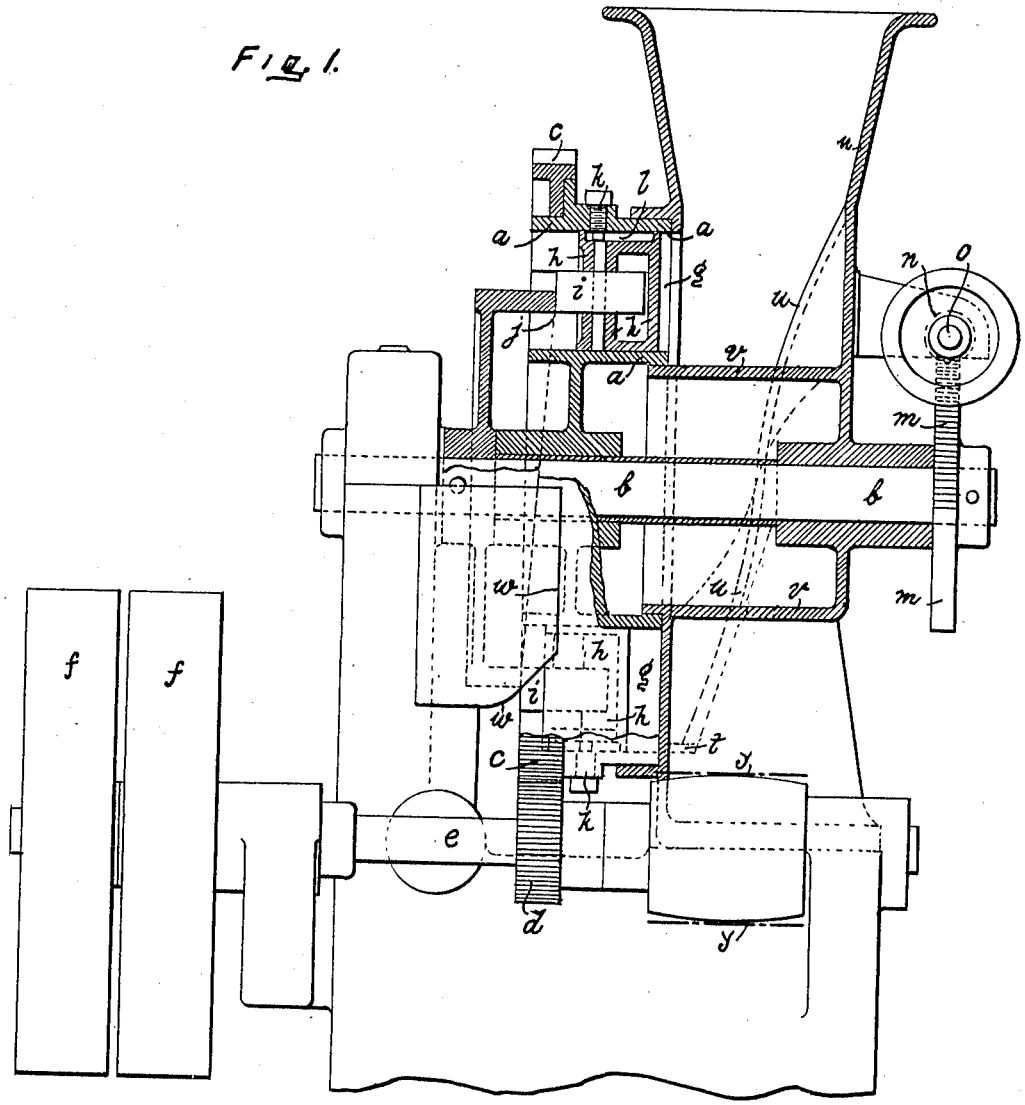

A. M. MELVIN.
MACHINE FOR DIVIDING AND MOLDING DOUGH AND OTHER PLASTIC SUBSTANCES.
APPLICATION FILED MAY 24, 1910.

1,061,248.

Patented May 6, 1913.

3 SHEETS—SHEET 1.

WITNESSES

INVENTOR
Alexander Morris Melvin
BY
Howson and Howson
his ATTORNEYS

A. M. MELVIN.
MACHINE FOR DIVIDING AND MOLDING DOUGH AND OTHER PLASTIC SUBSTANCES.
APPLICATION FILED MAY 24, 1910.

1,061,248.

Patented May 6, 1913.
3 SHEETS—SHEET 2.

WITNESSES
L. H. Grote
M. E. Keir

INVENTOR
Alexander Morris Melvin
BY
Howson and Howson
his ATTORNEYS

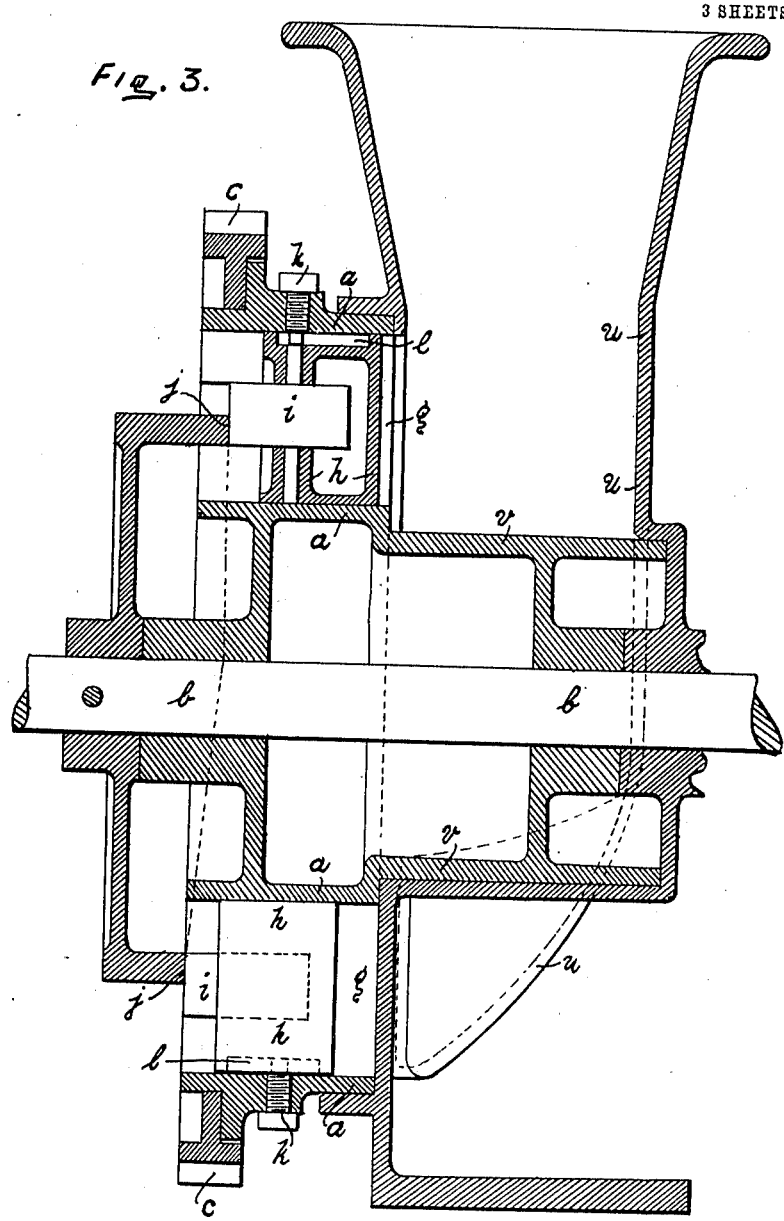

UNITED STATES PATENT OFFICE.

ALEXANDER MORRIS MELVIN, OF GLASGOW, SCOTLAND.

MACHINE FOR DIVIDING AND MOLDING DOUGH AND OTHER PLASTIC SUBSTANCES.

1,061,248.  Specification of Letters Patent.  Patented May 6, 1913.

Application filed May 24, 1910. Serial No. 563,188.

*To all whom it may concern:*

Be it known that I, ALEXANDER MORRIS MELVIN, a subject of the King of Great Britain and Ireland, and a resident of Glasgow, Scotland, have invented certain new and useful Improvements in Machines for Dividing and Molding Dough and other Plastic Substances, of which the following is the specification.

The invention relates to dough-dividing and molding machines of the type in which the dough or other substance is fed to apertures in the face of a rotating disk in which cam-operated plungers work, their direction of movement being parallel with the axis of the disk, this arrangement having the advantage over that in which the cam-operated plungers work in apertures in the periphery of a rotating drum in that there is no possibility of the lubricant used finding its way into the apertures and spoiling the dough, and the parts are more easily adjustable for wear.

The present invention has for its object to provide in machines of the disk type a simple and effective feeding device.

This improved device consists of a hopper of such form that it co-acts with the moving face of the disk in which are the dividing and molding apertures to feed the dough to those apertures.

According to the invention the hopper, of which the moving disk forms one side, is of conchoidal form; that is to say, its outer wall is cylindrical and abuts the periphery of the disk, while that side of it which is opposite the face of the disk is more or less helicoidal. Centrally, there is a cylindrical wall or boss which may be carried upon and rotate with the disk.

Dough or other plastic material fed into the mouth of the hopper is caught by the rotating disk, and, rolling between it and the more or less helicoid wall of the hopper, is subjected to such pressure that it readily fills the plungered apertures, to be forced thereoutof by the plungers after the limit of the hopper is passed, and removed from the disk by any usual means. Part or parts of the rotatory disk may be serrated in order to increase its action upon the dough.

In order that the invention and the manner of performing the same may be properly understood, there are hereunto appended three sheets of explanatory drawings, throughout which like reference symbols indicate like parts and in which—

Figure 2:
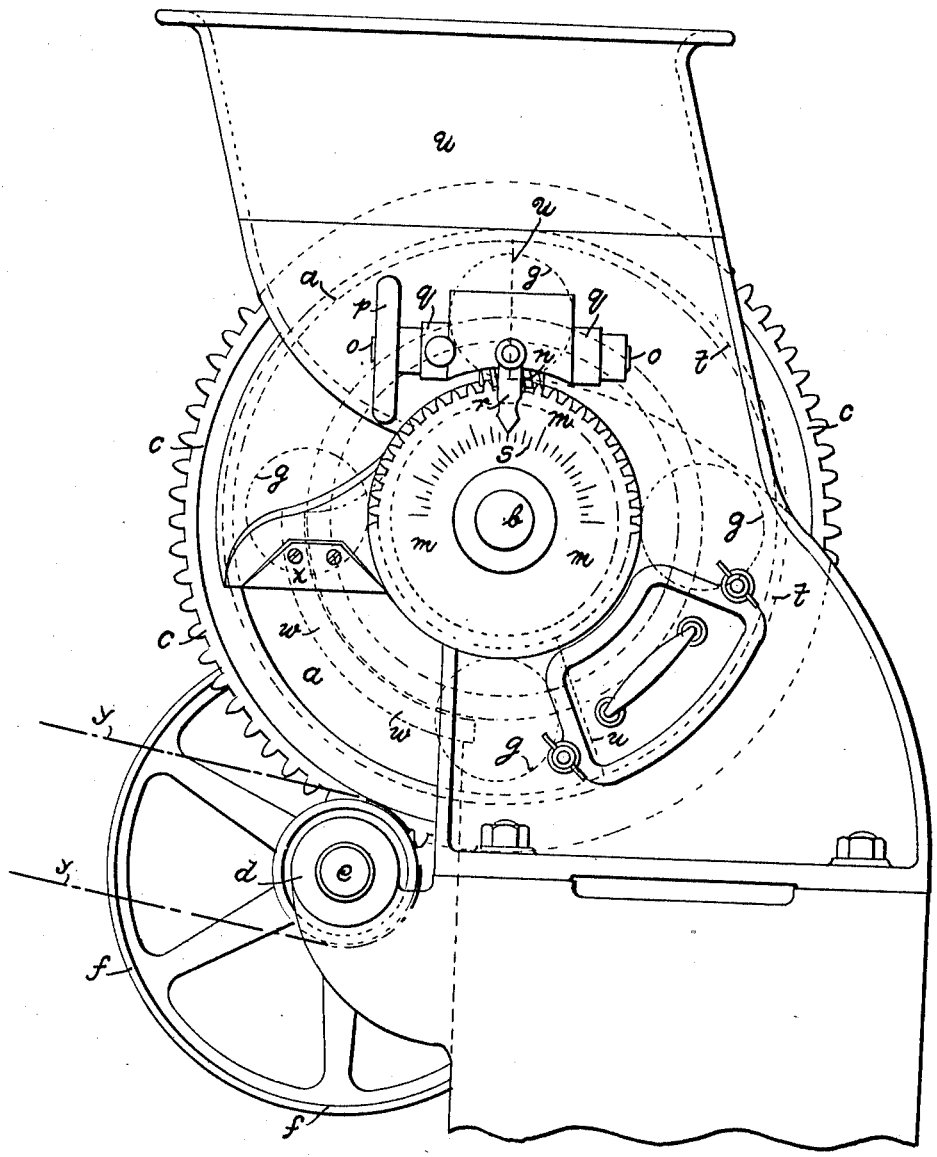

Figure 1, Sheet 1, is a sectional side elevation, and Fig. 2, Sheet 2, an end elevation, showing one example of the present invention, while Fig. 3, Sheet 3, is a sectional side elevation of a modified form.

According to the example shown in Figs. 1 and 2, the machine is of the type in which there is a disk $a$ capable of rotating on a horizontal shaft $b$ carried in bearings in the framing of the machine, the disk $a$ being driven through spur gearing $c$, $d$ from a first motion shaft $e$ on which are fast and loose pulleys $f$ for a driving belt. The dough is fed, as hereinafter described, to apertures $g$ in the disk, in which apertures there work plungers $h$ carrying rollers $i$ bearing on a circular cam track $j$ secured on the shaft $b$, the plungers $h$ being prevented from turning in the apertures $g$ by pins $k$ screwed through the periphery of the disk $a$ and entering grooves $l$ formed in the circumference of the plungers. On one end of the shaft $b$ there is secured a wormsector $m$ gearing with a worm $n$ on a spindle $o$ fitted with a handwheel $p$ and capable of turning in bearings in a bracket $q$ by which means the shaft $b$ may be turned to adjust the position of the cam $j$ and thus regulate the travel of the plungers $h$ and consequently the pressure applied to the dough while in the apertures $g$. A fixed pointer $r$ extends over a scale $s$ on the wormsector $m$ and thus shows the position of the cam $j$.

According to the invention part of the hopper is of conchoidal form, its outer wall $t$ is substantially cylindrical and abuts the periphery of the disk, while that side $u$ of it which is opposite the face of the disk is more or less helicoidal. Centrally there is a stationary cylindrical boss $v$ made in a piece with the outer wall of the framing.

Dough or other plastic material fed into the mouth of the hopper is caught by the rotating disk $a$ and, rolling between it and the helicoid part of the wall $u$ of the hopper, is subjected to such pressure that it readily fills the plungered apertures $g$. When the disk $a$ in rotating reaches the point at which the helicoid wall $u$ ends, the rollers $i$ on the plungers $h$ encounter a fixed cam $w$, so that the plungers are operated to force the dough out of the apertures $g$, a scraping blade $x$ fixed to the casing being applied at a suitable point to the face of the disk *a* to insure the removal of the extruded dough which falls onto a conveyer belt *v*.

According to the example shown in Fig. 3, the wall *u* of the hopper which is opposite the face of the disk *a* differs from the example hereinbefore described in that it is parallel with the face of the disk for the greater part of its extent and terminates in a comparatively short helicoid part *z*. It will thus be apparent that the so-called more or less helicoid wall *u* need only be helicoid or approximately so at the inner end of the hopper, that is to say, the hopper may be annular and parallel for a greater part of its length terminating at its inner end in a partition or extension only sufficiently sloped—that is helicoid—to prevent massing of the dough against it. In this example the cylindrical boss *v* is made in a piece with and rotates with the disk *a*, though it is to be understood that in both examples described the boss *v* may be arranged so as to be either stationary or rotatable.

What I claim is:—

1. In a machine for dividing and molding dough and other plastic substances and of the type in which cam-operated plungers work in apertures in the face of a rotating mold disk; a hopper consisting of the rotating disk acting as one wall, an outer cylindrical wall abutting the periphery of the disk, a partially helicoidal wall opposite the face of the disk and, centrally within the hopper, a cylindrical wall or boss arranged between said disk and hopper wall, for the purpose described.

2. In a machine for dividing and molding dough and other plastic substances and of the type in which cam-operated plungers work in apertures in the face of a rotating mold disk, a hopper consisting of the rotating disk acting as one wall, an outer cylindrical wall abutting the periphery of the disk, a wall opposite to the face of the disk, parallel thereto for a part of its length and ending in a helicoidal part and centrally within the hopper a cylindrical wall or boss arranged between said disk and hopper wall, for the purpose described.

In testimony whereof I have signed my name to this specification, in the presence of two subscribing witnesses.

ALEXANDER MORRIS MELVIN.

Witnesses:
DAVID FERGUSON,
WILFRED HUNT.

---

Copies of this patent may be obtained for five cents each, by addressing the "Commissioner of Patents Washington, D. C."